(12) United States Patent
Li et al.

(10) Patent No.: US 9,389,902 B2
(45) Date of Patent: Jul. 12, 2016

(54) SETTING RETRANSMISSION TIME OF AN APPLICATION CLIENT DURING VIRTUAL MACHINE MIGRATION

(71) Applicant: International Business Machines Corporation, Armonk, NY (US)

(72) Inventors: Li Li, Beijing (CN); Liang Liu, Beijing (CN); Jun Mei Qu, Beijing (CN); Qi Yu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/487,288

(22) Filed: Sep. 16, 2014

(65) Prior Publication Data

US 2015/0095909 A1 Apr. 2, 2015

(30) Foreign Application Priority Data

Sep. 27, 2013 (CN) .......................... 2013 1 0450450

(51) Int. Cl.
  *G06F 9/445* (2006.01)
  *H04L 1/18* (2006.01)
  *G06F 9/455* (2006.01)

(52) U.S. Cl.
  CPC ............ *G06F 9/45558* (2013.01); *H04L 1/188* (2013.01); *G06F 2009/4557* (2013.01); *H04L 1/1887* (2013.01)

(58) Field of Classification Search
  None
  See application file for complete search history.

(56) References Cited

U.S. PATENT DOCUMENTS

| 6,802,062 B1 * | 10/2004 | Oyamada | G06F 9/45558 718/1 |
| 8,352,953 B2 * | 1/2013 | Bozek | H04L 41/0806 718/104 |
| 8,745,234 B2 * | 6/2014 | Liu | G06F 9/4856 709/226 |
| 8,843,924 B2 * | 9/2014 | Dow | G06F 9/45504 718/1 |
| 2004/0017784 A1 * | 1/2004 | Backlund | H04L 1/188 370/256 |

(Continued)

OTHER PUBLICATIONS

Li, Xiang, et al., DartCSim+: Enhanced CloudSim with the Power and Network Models Integrated, 2013 IEEE Sixth International Conference on Cloud Computing (CLOUD), Jun. 28, 2013-Jul. 3, 2013, pp. 644-651, [retrieved on Nov. 23, 2015], Retrieved from the Internet: <URL:http://ieeexplore.ieee.org/>.*

(Continued)

*Primary Examiner* — Tuan Q. Dam
*Assistant Examiner* — Geoffrey St Leger
(74) *Attorney, Agent, or Firm* — Cantor Colburn LLP; Kelvan Razavi

(57) ABSTRACT

A method of setting retransmission time of an application client during virtual machine migration includes predicting migration memory size required by a virtual machine to be migrated based on historical access log of at least one application and memory log of the virtual machine to be migrated; computing available migration bandwidth of a host of the virtual machine to be migrated; computing virtual machine migration time based on the predicted migration memory size required by the virtual machine to be migrated and the available migration bandwidth of the host; and setting retransmission time of the application client based on the virtual machine migration time.

15 Claims, 4 Drawing Sheets

(56) References Cited

U.S. PATENT DOCUMENTS

| | | | |
|---|---|---|---|
| 2011/0138384 A1* | 6/2011 | Bozek | H04L 41/0806 718/1 |
| 2011/0211461 A1* | 9/2011 | Bahr | H04L 1/1887 370/245 |
| 2012/0011508 A1 | 1/2012 | Ahmad et al. | |
| 2012/0166644 A1* | 6/2012 | Liu | G06F 9/4856 709/226 |
| 2012/0233613 A1* | 9/2012 | Shimogawa | G06F 9/45558 718/1 |
| 2012/0278804 A1* | 11/2012 | Narayanasamy | G06F 9/45558 718/1 |
| 2012/0324445 A1* | 12/2012 | Dow | G06F 9/45504 718/1 |
| 2013/0086272 A1 | 4/2013 | Chen et al. | |
| 2013/0159806 A1* | 6/2013 | Okuno | H04L 1/18 714/749 |

OTHER PUBLICATIONS

Wang, Y., et al., Virtual routers on the move: live router migration as a network-management primitive, Proceedings of the ACM SIGCOMM 2008 conference on Data communication, 2008, pp. 231-242, [retrieved on Nov. 23, 2015], Retrieved from the Internet: <URL:http://dl.acm.org/>.*

Wang, Q. et al., Impact of Cloud Computing Virtualization Strategies on Workloads' Performance, 2011 Fourth IEEE International Conference on Utility and Cloud Computing (UCC), Dec. 5-8, 2011, pp. 130-137, [retrieved on Mar. 14, 2016], Retrieved from the Internet: <URL:http://ieeexplore.ieee.org/>.*

* cited by examiner

SETTING RETRANSMISSION TIME OF AN APPLICATION CLIENT DURING VIRTUAL MACHINE MIGRATION

FOREIGN PRIORITY

This application claims priority to Chinese Patent Application No. 201310450450.6, filed Sep. 27, 2013, and all the benefits accruing therefrom under 35 U.S.C. §119, the contents of which in its entirety are herein incorporated by reference.

TECHNICAL FIELD

The present invention relates to virtual machine migration, and more particularly, to a method and system of setting retransmission time of an application client during virtual machine migration.

BACKGROUND

Currently, virtualization technology has been widely used. Virtualization technology provides an approach capable of accommodating a plurality of Virtual Machines (VMs) on a large server, which reduces total cost of user and improves reliability and flexibility of applications, thereby reducing possibility of providing excessive computing resource by user for spike of various workloads. Moreover, virtualization technology helps to isolate important applications, such that different applications running on different virtual machines will not share operation system, thus critical failure caused by an application will not affect applications in any other virtual machines. The virtualization technology is an important and fundamental technology in "cloud computing" technology, and since it has the capabilities of on-demand configuration and dynamic migration, it becomes a key for realizing dynamic and scalable extension of cloud computing. In order to realize the high flexibility of the cloud computing to satisfy policies and requirements of services or management, dynamic migration and aggregation of virtual machines among physical machines need to be performed frequently, so as to achieve the objectives of reducing energy consumption, improving resource utilization and lowering management costs, etc.

However, virtual machine migration is a highly I/O sensitive process. During the process that the virtual machine is migrated, since the services or applications thereon are still in operation, this will produce unexpected influence on application clients of the virtual machine. For example, during the process of virtual machine migration, an application client of the virtual machine issues a request to the virtual machine, this will cause a response failure, thus a retransmission request needs to be sent, the criterion of TCP protocol for controlling whether a data segmented needs to be retransmitted is to set a retransmission timer. A retransmission timer is started when a data segment is sent. If an acknowledgement is received before the timer is timed out, the retransmission time is turned off. If no acknowledge is received before the timer is timed out, the data segment is retransmitted. During the process of selecting retransmission time, TCP has to be adaptive. It needs to give a suitable data retransmission time based on communication condition of Internet at that time. Currently, a frequently used algorithm is a dynamic algorithm that continuously adjust time-out time interval. Its operation principle is as follows: a variable Round Trip Time (RTT) is maintained for each connected TCP, which is used to store an estimated value closest to time required for a round trip between current and destination end. If no acknowledge is received before the timer is timed out, value of RTT is doubled. As number of times of connection failure increases, value of RTT is larger and larger. During the process of virtual machine migration, since value of RTT is small, number of times of retransmission will increase. If the virtual machine migration has already been completed, since value of RTT is larger and larger as number of times of retransmission increases, response delay will occur at client.

Thus, when a virtual machine is being migrated, a suitable retransmission time needs to be set for application client, so as to respond to request of the client in time.

SUMMARY

In one embodiment, a method of setting retransmission time of an application client during virtual machine migration includes predicting migration memory size required by a virtual machine to be migrated based on historical access log of at least one application and memory log of the virtual machine to be migrated; computing available migration bandwidth of a host of the virtual machine to be migrated; computing virtual machine migration time based on the predicted migration memory size required by the virtual machine to be migrated and the available migration bandwidth of the host; and setting retransmission time of the application client based on the virtual machine migration time.

In another embodiment, an apparatus for setting retransmission time of an application client during virtual machine migration includes a migration memory predicting module configured to predict migration memory size required by a virtual machine to be migrated based on historical access log of at least one application and memory log of the virtual machine to be migrated; an available bandwidth computing module configured to compute available migration bandwidth of a host of the virtual machine to be migrated; a migration time computing module configured to compute virtual machine migration time based on the predicted migration memory size required by the virtual machine to be migrated and the available migration bandwidth of the host; and a retransmission time setting module configured to set retransmission time of the application client based on the virtual machine migration time.

In another embodiment, a non-transitory, computer readable storage medium has instructions stored thereon that, when executed by a computer, implement a method of setting retransmission time of an application client during virtual machine migration. The method includes predicting migration memory size required by a virtual machine to be migrated based on historical access log of at least one application and memory log of the virtual machine to be migrated; computing available migration bandwidth of a host of the virtual machine to be migrated; computing virtual machine migration time based on the predicted migration memory size required by the virtual machine to be migrated and the available migration bandwidth of the host; and setting retransmission time of the application client based on the virtual machine migration time.

The method and apparatus according to embodiments of the invention are capable of setting suitable retransmission time, responding to request of application clients in time, reducing number of times of retransmission, and lowering overhead of network transmission.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
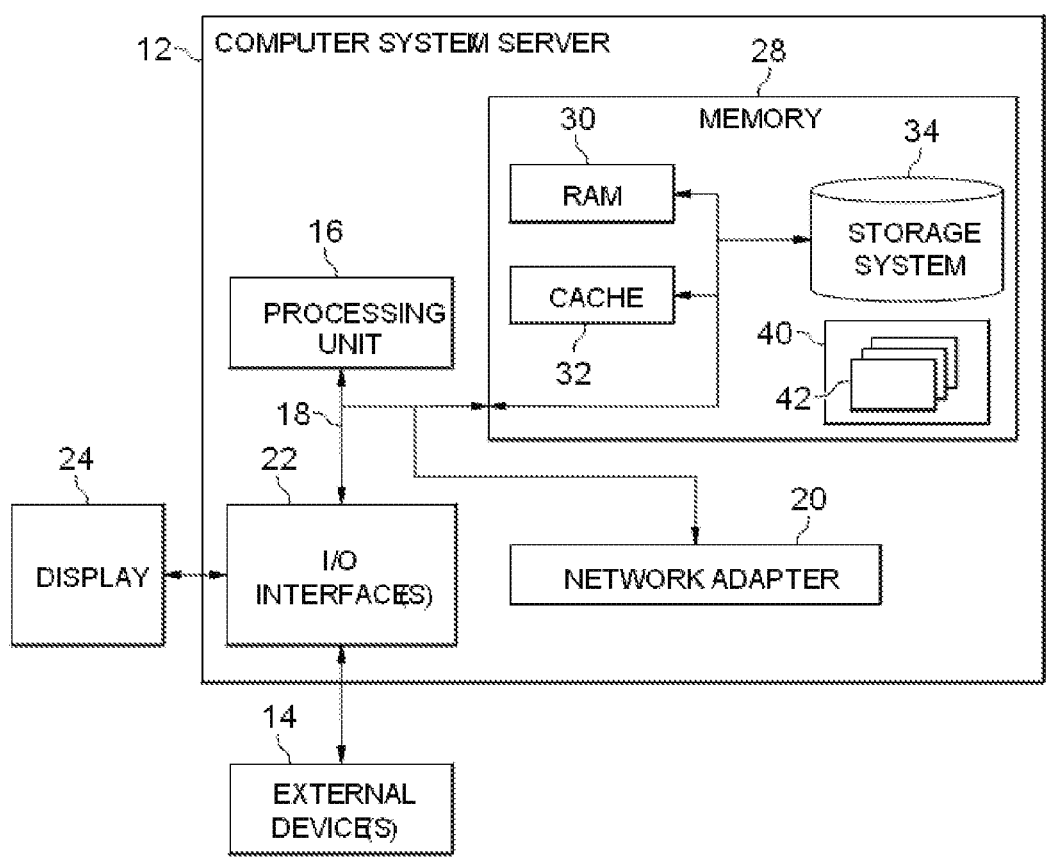
FIG. 1 shows a block diagram of an exemplary computer system/server which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which a block diagram of an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
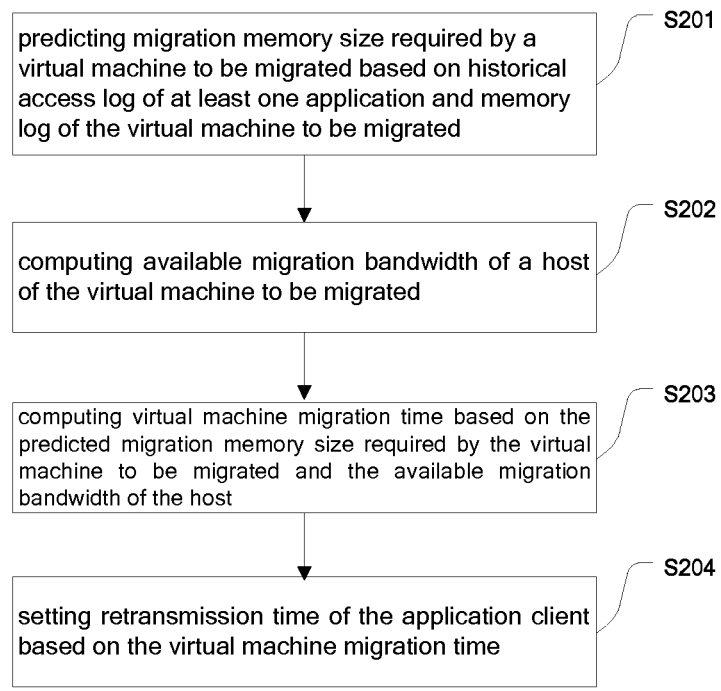
FIG. 2 shows a method of setting retransmission time of an application client during virtual machine migration according to an embodiment of the invention.

Referring now to FIG. 2, in which a method of setting retransmission time of an application client during virtual machine migration according to an embodiment of the invention is shown, the method comprising: in block S201, predicting migration memory size required by a virtual machine to be migrated based on historical access log of at least one application and memory log of the virtual machine to be migrated; in block S202, computing available migration bandwidth of a host of the virtual machine to be migrated; in block S203, computing virtual machine migration time based on the predicted migration memory size required by the virtual machine to be migrated and the available migration bandwidth of the host; in block S204, setting retransmission time of the application client based on the virtual machine migration time.

In block S201, predicting migration memory size required by a virtual machine to be migrated based on historical access log of at least one application of the virtual machine to be migrated comprises: computing change in request arrival rate of the at least one application and average service time of each request within a period of time based on the historical access log of the at least one application; collecting statistics about change in memory size allocated by the virtual machine to be migrated to the at least one application within the period of time based on the memory log of the virtual machine to be migrated; computing a function relation between the memory size allocated by the virtual machine to be migrated to the at least one application and the request arrival rate of the at least one application within the period of time based on the change in request arrival rate of the at least one application and the change in memory size allocated by the virtual machine to be migrated to the at least one application within the period of time; and predicting migration memory size required by the virtual machine to be migrated based on the function relation.

According to an embodiment of the invention, predicting migration memory size required by the virtual machine to be migrated based on the function relation comprises: predicting migration memory size required by the at least one application based on the function relation and request arrival rate of the at least one application at migration time; obtaining migration memory size required by the virtual machine to be migrated by accumulating memory size required by the at least one application.

According to an embodiment of the invention, it is observed that there is a linear correlation relationship between memory overhead required by a virtual machine to process each request and average service time corresponding to each request. When a new request arrives, a virtual machine will allocate certain memory for serving this request and average service time required by request of different types of application varies. Generally, the longer the average service time required by a request, the larger the memory allocated for that request. For example, for a complex application A and a simple application B, average service time for request of application of type A is 4 s, and average service time for request of application of type B is 2 s. Then, memory size allocated by a virtual machine for request of application of type A is substantially twice of memory size allocated for request of application of type B. A function relation between memory size allocated by a virtual machine for an application at any time and average service time requested for that application is as follows:

$$S = a * v * Ts + b \quad (1)$$

Wherein, S is memory size allocated by a virtual machine for an application at any time, a is a proportional coefficient, V is request arrival rate of that application within a period of time, Ts is average service time requested for that application, and b is a corrective parameter.

According to an embodiment of the invention, a hypervisor may acquire, from a virtual machine to be migrated, historical access log of an application of the virtual machine to be migrated, and compute request arrival rate v of an application within a period of time and average service time Ts of each request. Within historical access log of an application, operation such as reception, processing of a request and the like are recorded in time order. According to an embodiment of the invention, a typical historical access log of an application is as follows:

| Time tag | event |
|---|---|
| t0 | receive a request from ip0 |
| t1 | receive a request from ip1 |
| t2 | handle request from ip0 |
| t3 | receive a request from ip2 |
| t4 | handle request from ip1 |
| t5 | send reply to ip0 |
| ... | ... |
| tn_1 | handle request from ip2 |
| tn_2 | send reply to ip1 |
| tn_3 | send reply to ip2 |

According to the above historical access log, request arrival rate of the application within time period t0-t3 may be computed as: $v=3/(t3-t0)$ Average service time of request of that application is computed as: $Ts=(Ts\_1+Ts\_2+Ts\_3)/3$.

Wherein, at time t0, service time of request of that application received from IP address ip0 is: $Ts\_1=t5-t0$.

At time t1, service time of request of that application received from IP address ip1 is: $Ts\_2=tn\_2-t1$.

At time t3, service time of request of that application received from IP address ip2 is: $Ts\_3=tn\_3-t3$.

According to an embodiment of the invention, a hypervisor may acquire, from a virtual machine to be migrated, memory log of the virtual machine to be migrated, and may acquire memory size allocated by the virtual machine to an application at any time based on memory log of the virtual machine to be migrated. Thus, the proportional coefficient a and corrective parameter b in equation (1) may be computed according to historical data.

Figure 3:
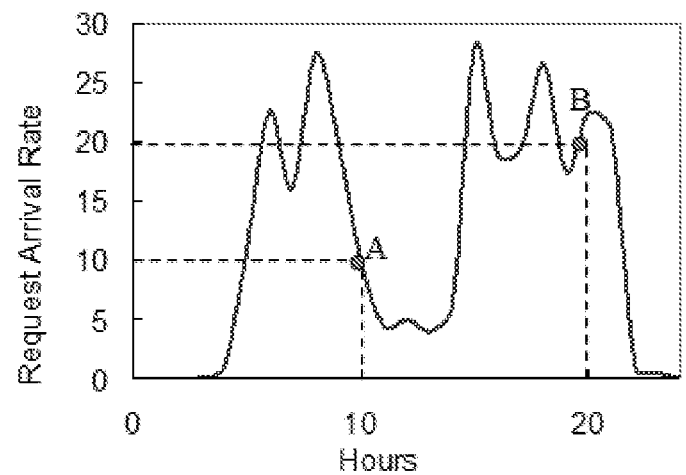
FIG. 3 shows a change curve of request arrival rate of an application of the virtual machine to be migrated within a period of time according to an embodiment of the invention.
Figure 4:
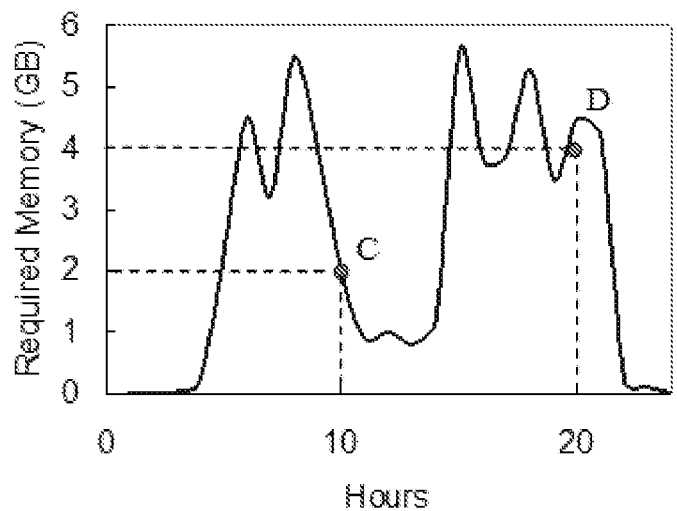
FIG. 4 shows a change curve of memory allocated by the virtual machine to be migrated to an application within a period of time according to an embodiment of the invention.

FIG. 3 shows a change curve of request arrival rate of an application of a virtual machine to be migrated within a period of time according to an embodiment of the invention. As shown, horizontal coordinate is time, vertical coordinate is request arrival rate of an application. FIG. 4 shows a change curve of memory allocated by a virtual machine to be migrated to an application within a period of time according to an embodiment of the invention. For example, two coordinate points A, B corresponding to two time points are selected in FIG. 3, and two coordinate points C, D corresponding to the same time points are selected in FIG. 4. At time point of 10 hours, request arrival rate is 10/s and memory size allocated by the virtual machine to be migrated to that application is 2 GB. At time point of 20 hours, request arrival rate is 20/s and memory size allocated by the virtual machine to be migrated to that application is 4 GB. Assume that average service time of request of that application is 2 s, values of the above coordinate points are substituted into equation (1), $$2=a*10*2+b \quad (2)$$

$$4=a*20*2+b \quad (3)$$

It is solved that a=0.1, b=0, thus equation (1) directed to that application is transformed into:

$$S=0.2*v \quad (4)$$

At current time at which the virtual machine to be migrated is to be migrated, number of requests of the application being served by the virtual machine to be migrated is queried, request arrival rate of the application at current time is acquired, and migration memory size required by the application is computed according to equation (4).

In case that there are a plurality of applications, a function relation between memory size allocated by the virtual machine to be migrated to the plurality of applications and request arrival rate corresponding to the plurality of applications within the period of time is acquired one by one by the method according to embodiments of the invention, and migration memory size required by the plurality of applications are predicted based on each function relation and request arrival rate at migration time, then, memory size required by the plurality of applications are accumulated to obtain migration memory size required by the virtual machine to be migrated.

In block S202, computing available migration bandwidth of a host of the virtual machine to be migrated. According to an embodiment of the invention, in case that there are a plurality of virtual machines requesting bandwidth from the host, if bandwidth of the host is greater than or equal to bandwidth requested by the plurality of virtual machines, then available migration bandwidth of the host of the virtual machine to be migrated is $$W_A = W_S - \sum_{i=1}^{j} W_i,$$

wherein $W_S$ is bandwidth of the host, $W_i$, (i=1 ... j, j≥1) is bandwidth requested by other virtual machines except the virtual machine to be migrated. For example, there are two virtual machines A and B on a host whose bandwidth is 1 Gbps. Bandwidth requested by virtual machine A is 200 Mbps and bandwidth requested by virtual machine B is 300 Mbps. If virtual machine A is to be migrated, available migration bandwidth of host of the virtual machine to be migrated is $W_A$=1 Gbps−1 Mbps=700 Mbps. According to another embodiment of the invention, in case that there are a plurality of virtual machines requesting bandwidth from a host, if bandwidth of the host is smaller than bandwidth requested by the plurality of virtual machines, then available migration bandwidth of the host of the virtual machine to be migrated is calculated based on weight of the virtual machine to be migrated. The available migration bandwidth of the host of the virtual machine to be migrated is $$W_A = \frac{P_j}{\sum_{i=1}^{n} P_i} W_S,$$

j∈(1 ... n), wherein $P_j$ is weight of the virtual machine to be migrated, $$\sum_{i=1}^{n} P_i$$

is sum of weight of all virtual machines. For example, there are two virtual machines A and B on a host whose bandwidth is 1 Gbps, bandwidth requested by virtual machine A is 800 Mbps, weight is 5, and bandwidth requested by virtual machine B is 500 Mbps, weight is 3. If virtual machine A is to be migrated, then migration bandwidth is $$W_A = \frac{5}{5+3} * 1 \text{ Gbps} = 0.625 \text{ Gbps}.$$

In block S203, computing virtual machine migration time based on the predicted migration memory size required by the virtual machine to be migrated and the available migration bandwidth, that is, virtual machine migration time is $$T = \frac{M}{W_A},$$

wherein M is migration memory size of the virtual machine, $W_A$ is available migration bandwidth of the host.

In block S204, setting retransmission time of the application client based on the virtual machine migration time. In particularly, before a virtual machine is migrated, a hypervisor predicts migration time of the virtual machine and sets retransmission time of the application client to be slightly larger than migration time of the virtual machine so as to obtain a relatively accurate retransmission time. According to the retransmission time, a time instruction that a connection may be established is issued to the client, and the application client, upon receiving the instruction, sends a request to the migrated virtual machines according to the time set in the instruction.

The method of setting retransmission time of an application client during virtual machine migration according to embodiments of the invention has avoided setting Round Trip Time (RTT) as retransmission time as in conventional TCP protocol, prevents problems such as increase in number of times of retransmission and response delay of application client etc, rather, it takes into account factors influencing migration time of a virtual machine, set retransmission time by using predicted migration time of the virtual machine so as to set suitable retransmission time, and responds to request of an application client in time.

Figure 5:
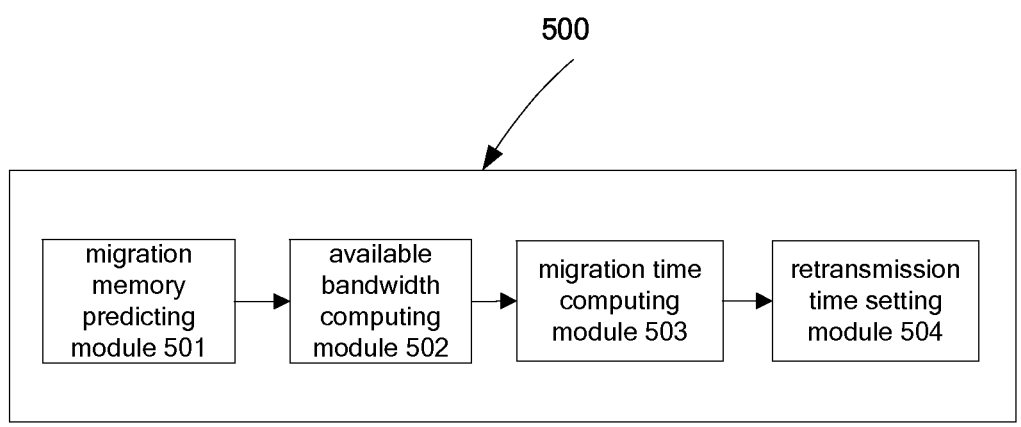
FIG. 5 shows an apparatus of setting retransmission time of an application client during virtual machine migration according to an embodiment of the invention.

Based on a same inventive conception, the invention also provides an apparatus of setting retransmission time of an application client during virtual machine migration. FIG. 5 shows an apparatus 500 of setting retransmission time of an application client during virtual machine migration according to an embodiment of the invention, comprising: a migration memory predicting module 501 configured to predict migration memory size required by a virtual machine to be migrated based on historical access log of at least one application and memory log of the virtual machine to be migrated; an available bandwidth computing module 502 configured to compute available migration bandwidth of a host of the virtual machine to be migrated; a migration time computing module 503 configured to compute virtual machine migration time based on the predicted migration memory size required by the virtual machine to be migrated and the available migration bandwidth of the host; a retransmission time setting module 504 configured to set retransmission time of the application client based on the virtual machine migration time.

According to an embodiment of the invention, wherein the migration memory predicting module 501 is further configured to: compute change in request arrival rate of the at least one application and average service time of each request within a period of time based on the historical access log of the at least one application; collect statistics about change in memory size allocated by the virtual machine to be migrated to the at least one application within the period of time based on the memory log of the virtual machine to be migrated; compute a function relation between the memory size allocated by the virtual machine to be migrated to the at least one application and the request arrival rate of the at least one application within the period of time based on the change in request arrival rate of the at least one application and the change in memory size allocated by the virtual machine to be migrated to the at least one application within the period of time; and predict migration memory size required by the virtual machine to be migrated based on the function relation.

According to an embodiment of the invention, wherein the migration memory predicting module 501 is further configured to: predict migration memory size required by the at least one application based on the function relation and request arrival rate of the at least one application at migration time; obtain migration memory size required by the virtual machine to be migrated by accumulating memory size required by the at least one application.

According to an embodiment of the invention, wherein the available bandwidth computing module 502 is configured to: in case that there are a plurality of virtual machines requesting bandwidth from the host, if bandwidth of the host is greater than or equal to bandwidth requested by the plurality of virtual machines, then available migration bandwidth of the host of the virtual machine to be migrated is $$W_A = W_S - \sum_{i=1}^{j} W_i,$$

wherein $W_S$ is bandwidth of the host, $W_i$, (i=1 . . . j, j≥1) is bandwidth requested by other virtual machines except the virtual machine to be migrated.

According to an embodiment of the invention, wherein the available bandwidth computing module 502 is configured to: in case that there are a plurality of virtual machines requesting bandwidth from the host, if bandwidth of the host is smaller than bandwidth requested by the plurality of virtual machines, then compute available migration bandwidth of the host of the virtual machine to be migrated based on weight of the virtual machine to be migrated.

According to an embodiment of the invention, wherein the retransmission time setting module 504 is further configured to set retransmission time of the application client to be slightly larger than migration time of the virtual machine.

For detailed implementation of each of the above modules, reference may be made to description of the method of setting retransmission time of an application client during virtual machine migration according to embodiments of the invention, which will be omitted here for brevity.

The method and apparatus of setting retransmission time of an application client during virtual machine migration according to embodiments of the invention may be installed in a hypervisor as a plug-in of an application.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of setting retransmission time of an application client during virtual machine migration, the method comprising:
    predicting, with a processing device, migration memory size required by a virtual machine to be migrated based on historical access log of at least one application and memory log of the virtual machine to be migrated by:
        computing change in request arrival rate of the at least one application and average service time of each request within a period of time based on the historical access log of the at least one application;
        collecting statistics about change in memory size allocated by the virtual machine to be migrated to the at least one application within the period of time based on the memory log of the virtual machine to be migrated;
        computing a function relation between the memory size allocated by the virtual machine to be migrated to the at least one application and the request arrival rate of the at least one application within the period of time based on the change in request arrival rate of the at least one application and the change in memory size allocated by the virtual machine to be migrated to the at least one application within the period of time; and
        predicting migration memory size required by the virtual machine to be migrated based on the function relation;
    computing available migration bandwidth of a host of the virtual machine to be migrated;
    computing virtual machine migration time based on the predicted migration memory size required by the virtual machine to be migrated and the available migration bandwidth of the host; and
    setting retransmission time of the application client based on the virtual machine migration time.

2. The method of claim 1, wherein the predicting migration memory size required by the virtual machine to be migrated based on the function relation comprises:
    predicting migration memory size required by the at least one application based on the function relation and request arrival rate of the at least one application at migration time;
    obtaining migration memory size required by the virtual machine to be migrated by accumulating memory size required by the at least one application.

3. The method of claim 1, wherein the computing available migration bandwidth of a host of the virtual machine to be migrated comprises:
    in case that there are a plurality of virtual machines requesting bandwidth from the host, if bandwidth of the host is greater than or equal to bandwidth requested by the plurality of virtual machines, then available migration bandwidth of the host of the virtual machine to be migrated is $$W_A = W_S - \sum_{i=1}^{j} W_i,$$

wherein $W_S$ is bandwidth of the host, $W_i$, ($i=1 \ldots k$, $j \geq 1$) is bandwidth requested by other virtual machines except the virtual machine to be migrated.

4. The method of claim 1, wherein the computing available migration bandwidth of a host of the virtual machine to be migrated comprises:
    in case that there are a plurality of virtual machines requesting bandwidth from the host, if bandwidth of the host is smaller than bandwidth requested by the plurality of virtual machines, then computing available migration bandwidth of the host of the virtual machine to be migrated based on weight of the virtual machine to be migrated.

5. The method of claim 1, wherein the setting retransmission time of the application client based on the virtual machine migration time comprises:
    setting retransmission time of the application client to be larger than migration time of the virtual machine.

6. An apparatus for setting retransmission time of an application client during virtual machine migration, comprising:
    a migration memory predicting module configured to predict migration memory size required by a virtual machine to be migrated based on historical access log of at least one application and memory log of the virtual machine to be migrated wherein the migration memory predicting module is further configured to:
        compute change in request arrival rate of the at least one application and average service time of each request within a period of time based on the historical access log of the at least one application;
        collect statistics about change in memory size allocated by the virtual machine to be migrated to the at least one application within the period of time based on the memory log of the virtual machine to be migrated;
        compute a function relation between the memory size allocated by the virtual machine to be migrated to the at least one application and the request arrival rate of the at least one application within the period of time based on the change in request arrival rate of the at least one application and the change in memory size allocated by the virtual machine to be migrated to the at least one application within the period of time; and
        predict migration memory size required by the virtual machine to be migrated based on the function relation;
    an available bandwidth computing module configured to compute available migration bandwidth of a host of the virtual machine to be migrated;
    a migration time computing module configured to compute virtual machine migration time based on the predicted migration memory size required by the virtual machine to be migrated and the available migration bandwidth of the host; and a retransmission time setting module configured to set retransmission time of the application client based on the virtual machine migration time.

7. The apparatus of claim 6, wherein the migration memory predicting module is further configured to:
   predict migration memory size required by the at least one application based on the function relation and request arrival rate of the at least one application at migration time;
   obtain migration memory size required by the virtual machine to be migrated by accumulating memory size required by the at least one application.

8. The apparatus of claim 6, wherein the available bandwidth computing module is configured to:
   in case that there are a plurality of virtual machines requesting bandwidth from the host, if bandwidth of the host is greater than or equal to bandwidth requested by the plurality of virtual machines, then available migration bandwidth of the host of the virtual machine to be migrated is $$W_A = W_S - \sum_{i=1}^{j} W_i,$$

wherein $W_S$ is bandwidth of the host, $W_i$, ($i=1 \ldots j, j \geq 1$) is bandwidth requested by other virtual machines except the virtual machine to be migrated.

9. The apparatus of claim 6, wherein the available bandwidth computing module is configured to:
   in case that there are a plurality of virtual machines requesting bandwidth from the host, if bandwidth of the host is smaller than bandwidth requested by the plurality of virtual machines, then compute available migration bandwidth of the host of the virtual machine to be migrated based on weight of the virtual machine to be migrated.

10. The apparatus of claim 6, wherein the retransmission time setting module is further configured to:
    set retransmission time of the application client to be larger than migration time of the virtual machine.

11. A non-transitory, computer readable storage medium having instructions stored thereon that, when executed by a computer, implement a method of setting retransmission time of an application client during virtual machine migration, the method comprising:
    predicting, with a processing device, migration memory size required by a virtual machine to be migrated based on historical access log of at least one application and memory log of the virtual machine to be migrated by:
       computing change in request arrival rate of the at least one application and average service time of each request within a period of time based on the historical access log of the at least one application;
       collecting statistics about change in memory size allocated by the virtual machine to be migrated to the at least one application within the period of time based on the memory log of the virtual machine to be migrated;
       computing a function relation between the memory size allocated by the virtual machine to be migrated to the at least one application and the request arrival rate of the at least one application within the period of time based on the change in request arrival rate of the at least one application and the change in memory size allocated by the virtual machine to be migrated to the at least one application within the period of time; and
       predicting migration memory size required by the virtual machine to be migrated based on the function relation;
    computing available migration bandwidth of a host of the virtual machine to be migrated;
    computing virtual machine migration time based on the predicted migration memory size required by the virtual machine to be migrated and the available migration bandwidth of the host; and
    setting retransmission time of the application client based on the virtual machine migration time.

12. The non-transitory, computer readable storage medium of claim 11, wherein the predicting migration memory size required by the virtual machine to be migrated based on the function relation comprises:
    predicting migration memory size required by the at least one application based on the function relation and request arrival rate of the at least one application at migration time;
    obtaining migration memory size required by the virtual machine to be migrated by accumulating memory size required by the at least one application.

13. The non-transitory, computer readable storage medium of claim 11, wherein the computing available migration bandwidth of a host of the virtual machine to be migrated comprises:
    in case that there are a plurality of virtual machines requesting bandwidth from the host, if bandwidth of the host is greater than or equal to bandwidth requested by the plurality of virtual machines, then available migration bandwidth of the host of the virtual machine to be migrated is $$W_A = W_S - \sum_{i=1}^{j} W_i,$$

wherein $W_S$ is bandwidth of the host, $W_i$, ($i=1 \ldots j, j \geq 1$) is bandwidth requested by other virtual machines except the virtual machine to be migrated.

14. The non-transitory, computer readable storage medium of claim 11, wherein the computing available migration bandwidth of a host of the virtual machine to be migrated comprises:
    in case that there are a plurality of virtual machines requesting bandwidth from the host, if bandwidth of the host is smaller than bandwidth requested by the plurality of virtual machines, then computing available migration bandwidth of the host of the virtual machine to be migrated based on weight of the virtual machine to be migrated.

15. The non-transitory, computer readable storage medium of claim 11, wherein the setting retransmission time of the application client based on the virtual machine migration time comprises:
    setting retransmission time of the application client to be larger than migration time of the virtual machine.

* * * * *